US012272537B2

(12) United States Patent
Jackson

(10) Patent No.: US 12,272,537 B2
(45) Date of Patent: Apr. 8, 2025

(54) ION SOURCE

(71) Applicant: Beam Alpha, Inc., West Chicago, IL (US)

(72) Inventor: Gerald Peter Jackson, Lisle, IL (US)

(73) Assignee: Beam Alpha, Inc., West Chicago, IL (US)

( * ) Notice: Subject to any disclaimer, the term of this patent is extended or adjusted under 35 U.S.C. 154(b) by 404 days.

(21) Appl. No.: 17/926,614

(22) PCT Filed: Jun. 7, 2021

(86) PCT No.: PCT/US2021/036115
§ 371 (c)(1),
(2) Date: Nov. 20, 2022

(87) PCT Pub. No.: WO2021/252325
PCT Pub. Date: Dec. 16, 2021

(65) Prior Publication Data
US 2023/0101575 A1    Mar. 30, 2023

Related U.S. Application Data

(60) Provisional application No. 63/036,073, filed on Jun. 8, 2020.

(51) Int. Cl.
*H01J 49/00* (2006.01)
*H01J 49/14* (2006.01)
*H05H 7/12* (2006.01)

(52) U.S. Cl.
CPC ........ *H01J 49/0031* (2013.01); *H01J 49/147* (2013.01); *H05H 2007/125* (2013.01); *H05H 2007/127* (2013.01)

(58) Field of Classification Search
USPC ....................................................... 250/283
See application file for complete search history.

(56) References Cited

U.S. PATENT DOCUMENTS 3,120,475 A    2/1964  Bennett
3,258,402 A    6/1966  Farnsworth
(Continued)

FOREIGN PATENT DOCUMENTS

CA    0002310071 A1    5/1999
EP        4162519 A1    4/2023
(Continued)

OTHER PUBLICATIONS

"Examiner's Report" mailed Apr. 29, 2024, for Canadian Patent Application No. 3, 178,871. Titled: "Ion Source". Beam Alpha, Inc.pp. 1-7. Canadian Intellectual Patent Office. Canada.
(Continued)

*Primary Examiner* — Kiet T Nguyen
(74) *Attorney, Agent, or Firm* — Peter K. Trzyna

(57) ABSTRACT

A machine, article, process of using, process of making, products produced thereby and necessary intermediates. Illustratively, there can be a process that includes: ionizing at least some injected gas to form ions; confining, without using magnetic fields, at least some of said ions to produce confined ions; accumulating at least some of said confined ions to produce accumulated ions; cooling at least some of said accumulated ions to produce cooled ions; compressing, without using magnetic fields, at least some of said accumulated ions to produce compressed ions; accelerating at least some of said compressed ions to produce accelerated ions; ejecting at least some of said accelerated ions; and measuring at least one property of said ejected ions.

20 Claims, 15 Drawing Sheets

(56) References Cited

U.S. PATENT DOCUMENTS

| | | | |
|---|---|---|---|
| 3,386,883 | A | 6/1968 | Farnsworth |
| 3,533,910 | A | 10/1970 | Hirsch |
| 4,129,772 | A | 12/1978 | Navratil et al. |
| 4,172,008 | A | 10/1979 | Fleet |
| 4,639,348 | A | 1/1987 | Jarnagin |
| 4,949,011 | A | 8/1990 | Mann |
| 5,818,891 | A | 10/1998 | Rayburn et al. |
| 6,617,775 | B1 | 9/2003 | Seward |
| 9,543,052 | B2 | 1/2017 | Jackson |
| 10,421,412 | B2 | 10/2019 | Akinwande et al. |
| 2003/0173914 | A1 | 9/2003 | Yamashita |
| 2004/0213368 | A1 | 10/2004 | Rostoker |
| 2007/0023648 | A1 | 2/2007 | Baba |
| 2007/0045533 | A1 | 3/2007 | Krutchinsky et al. |
| 2007/0114380 | A1 | 5/2007 | Jackson |
| 2007/0114381 | A1 | 5/2007 | Jackson |
| 2008/0155985 | A1 | 7/2008 | Labrador |
| 2008/0187086 | A1 | 8/2008 | Bussard et al. |
| 2010/0072362 | A1 | 3/2010 | Giles et al. |
| 2011/0007860 | A1 | 1/2011 | Sanders, Jr. et al. |
| 2011/0286563 | A1 | 11/2011 | Moses et al. |
| 2013/0127376 | A1 | 5/2013 | Heid |
| 2013/0221216 | A1 | 8/2013 | Makarov et al. |
| 2013/0294558 | A1 | 11/2013 | Schulte |
| 2014/0061457 | A1* | 3/2014 | Berdnikov .......... H01J 49/0095 250/281 |
| 2016/0035552 | A1 | 2/2016 | Verenchikov |
| 2016/0189815 | A1 | 6/2016 | Czerwinski et al. |
| 2016/0216400 | A1 | 7/2016 | Navarro-Sorroche et al. |
| 2017/0011811 | A1 | 1/2017 | Slough et al. |
| 2017/0025190 | A1 | 1/2017 | Gibson |
| 2017/0125129 | A1 | 5/2017 | Hora et al. |
| 2017/0221694 | A1 | 8/2017 | Papanastasiou et al. |
| 2017/0294238 | A1 | 10/2017 | Zheng |
| 2018/0102191 | A1 | 4/2018 | Goldberg |
| 2019/0139650 | A1 | 5/2019 | Laberge et al. |
| 2020/0176133 | A1 | 6/2020 | Ooyama |
| 2020/0176135 | A1 | 6/2020 | Shihao |
| 2021/0252325 | A1 | 8/2021 | Segerstrom |
| 2022/0189647 | A1 | 6/2022 | Jackson |
| 2023/0352195 | A1 | 11/2023 | Jackson |

FOREIGN PATENT DOCUMENTS

| | | |
|---|---|---|
| WO | 2020185376 A1 | 9/2020 |
| WO | 2022031361 A2 | 2/2022 |
| WO | 2022046953 A2 | 3/2022 |

OTHER PUBLICATIONS

"Response and Amended Description" filed Aug. 28, 2024 in Canadian Patent Application No. 3,178,871. Titled: "Ion Source" Beam Alpha, Inc. Cassan Maclean IP Agency Inc. pp. 1-37. Canada.

Gerardo, J. B et al., "Electron-Beam Excitation of Gas Lasers", International Topical Conference on Electron Beam Research & Technology, Albuquerque, NM, USA, Nov. 3-5, 1975, pp. 169-192, https://ieeexplore.IEEE.org/document/6397723, 1975.

"Office Action—Restriction Requirement" issued Aug. 28, 2023, in U.S. Appl. No. 17/148,489. Titled "Ion Transport" for Beam Alpha, Inc. USPTO. pp. 1-9.

"Office Action-Non-Final" issued Jan. 5, 2024, in U.S. Appl. No. 17/148,489. Titled "Ion Transport" for Beam Alpha, Inc. USPTO. pp. 1-26.

"Declaration of Gerald Peter Jackson", filed May 11, 2024. Gerald Peter Jackson. pp. 1-24.

"Office Action-Final Rejection" issued Sep. 5, 2024, in U.S. Appl. No. 17/433,924. Titled "Direct Nuclear Power Conversion". Beam Alpha, Inc. USPTO. pp. 1-54.

"Reply to Rule 63(1) EPC" filed Sep. 5, 2024, in European Patent Application No. 21862687.7. Titled "Mixed Nuclear Power Conversion" for Beam Alpha, Inc. European Patent Office. pp. 1-7.

"Amendment and Response to Extended European Search Report" filed Oct. 7, 2024, in European Patent Application No. 21854417.9. Titled "Sulfur Blanket" for Beam Alpha, Inc. European Patent Office. pp. 1-47.

"Amendment and Response to Examiner's Report" filed Sep. 19, 2024, in Canadian Patent Application No. 3,178,742. Titled "Sulfur Blanket" for Beam Alpha, Inc. Canadian Intellectual Property Office. pp. 1-60.

Najmabadi, F. et al., "fusion reactor." Encyclopedia Britannica. https://www.britannica.com/technology/fusion-reactor. 2024. (Year: 2024).

Conn, R. "fusion reactor." Encyclopedia Britannica. https://www.britannica.com/science/nuclear-fusion. 2024. (Year: 2024).

"Brief on Appeal on Behalf of Appellant" for U.S. Appl. No. 17/433,924, Titled: "Direct Nuclear Power Conversion". Beam Alpha, Inc., filed Feb. 4, 2025. pp. 1-145.

"Evidence Appendix" for U.S. Appl. No. 17/433,924, Titled: "Direct Nuclear Power Conversion". Beam Alpha, Inc., filed Feb. 4, 2025. pp. 1-131.

https://www.energy.gov/doe-fusion-energy-strategy-2024-executive-summary "DOE Fusion Energy Strategy 2024, Executive Summary".

http://www.energy.gov/sites/default/files/2024-06/fusion-energy-strategy-2024.pdf.

"Office Action—Final Rejection" in U.S. Appl. No. 17/148,489. Titled: "Ion Source". Beam Alpha, Inc. dated Feb. 6, 2025. pp. 1-17. USPTO.

"Examiner's Report" for Canadian Application No. 3,178,742. Titled: "Sulfur Blanket". Beam Alpha, Inc. May 21, 2024. Canadian Intellectual Property Office. pp. 1-5. Canada.

"International Search Report" for PCT Patent Application No. PCT/US21/36115 Titled: "Ion Source". Beam Alpha, Inc. Sep. 27, 2021. pp. 1-3. PCT International Searching Authority.

"International Preliminary Report on Patentability" for PCT Patent Application No. PCT/US21/36115 Titled: "Ion Source". Beam Alpha, Inc. Jan. 31, 2022. pp. 1-8. PCT International Searching Authority.

"Extended European Search Report" for European Patent Application No. 21822733.8. Titled: "Ion Source". Beam Alpha, Inc. Jun. 11, 2024. pp. 1-11. European Patent Office.

Herfurth F et al.: "A linear radiofrequency ion trap for accumulation, bunching, and emittance improvement of radioactive ion beams", Nuclear Instruments & Methods in Physics Research. Section A, Elsevier BV * North-Holland, NL, val. 469, No. 2, Aug. 11, 2001 (Aug. 11, 2001), pp. 254-275, XP004299029, ISSN: 0168-9002, DOI: 10.1016/S0168-9002(01)00168-1.

Dieter Gerlich: "On the Combination of a Low Energy Hydrogen Atom Beam With a Cold Multipole Ion Trap", Dec. 9, 2008 (Dec. 9, 2008), pp. 1-144, XP093169321.

Andelkovic Zoran et al.: "Development of the HITRAP cooling trap and the EBIT offline ion source", Hyperfine Interactions, Publishing, Cham, Springer International val. 240, No. 1, Jun. 12, 2019 (Jun. 12, 2019), pp. 1-9, XP036804322, ISSN: 0304-3843, DOI: 10.1007/S10751-019-1605-8 [retrieved on Jun. 12, 2019].

Schramm U et al.: "Spatial Compression of Bunched Crystalline Ion Beams", Physica Scripta, val. T104, No. 1, Jan. 1, 2003 (Jan. 1, 2003), p. 189, XP0093162972, ISSN: 0031-8949, DOI: 10.1238/Physica.Topical. 104a00189. Retrieved from the Internet: URL:https://lopscience.iop.org/article/10.1238/Physica.Topical. 104a00189/pdf.

Wayne Mitano et al.: "Cooling methods in ion traps", Physica Scripta, val. T59, Jan. 1, 1995 (Jan. 1, 1995) pp. 106-120, XP0055613209, GB ISSN: 0031-8949, DOI: 10.1088/0031-8949/1995/T59/013.

Helmut Wiedemann: "Transformation in Phase Space" In: "Particle Accelerator Physics", Jan. 1, 2015 (Jan. 1, 2015), XP093169358, ISBN: 978-3-319-18316-9 pp. 1-10, DOI: 10.1007/978-3-319-18317-6, Retrieved from the Internet: URL:https://link.springer.com/chapter/10.1007/978-3-319-18317-6 8.

S. Sels: "Doppler and sympathetic cooling for the investigation of short-lived radioactive ions", Physical Review Research, val. 4, No. 3, Sep. 1, 2022 (Sep. 1, 2022), XP093169304, College Park, US ISSN: 2643-1564, DOI: 10.1103/PhysRevResearch.4.033229.

(56) References Cited

OTHER PUBLICATIONS

"Application as filed" for Canadian Patent Application No. 3, 178,871. Titled: "Ion Source". Beam Alpha, Inc. Nov. 15, 2022. pp. 1-15. Canadian Intellectual Patent Office. Canada.
"Second Preliminary Amendment" for U.S. Appl. No. 17/926,614. Titled: "Ion Source". Beam Alpha, Inc. filed May 22, 2023. pp. 1-8. USPTO.
"International Search Report and Written Opinion" for PCT Patent Application No. PCT/US21/47625 Titled: "Mixed Nuclear Power Conversion". Beam Alpha, Inc. Nov. 16, 2022. pp. 1-2. PCT International Searching Authority.
"Written Opinion" for PCT Patent Application No. PCT/US21/47625 Titled: "Mixed Nuclear Power Conversion", Beam Alpha, Inc. Nov. 16, 2022. pp. 1-18. PCT International Searching Authority.
"International Preliminary Report on Patentability" for PCT Patent Application No. PCT/US21/47625 Titled: "Mixed Nuclear Power Conversion". Beam Alpha, Inc. Nov. 16, 2022. pp. 1-16. PCT International Searching Authority.
"Office Action" for European Application No. 21862687.7. Titled: "Mixed Nuclear Power Conversion". Beam Alpha, Inc. Jul. 5, 2024. European Patent Office. pp. 1-4. Europe.
"Claims Amendment" for Canadian Application No. 3, 182,303 . Titled: "Mixed Nuclear Power Conversion". Beam Alpha, Inc. filed Dec. 12, 2022. European Patent Office. pp. 1-17. Canadian Patent Office.
Goldberg, Murrey D. and Le Blanc, James M. "Angular Distributions of the D (d, n)He3 Reaction for 5- to 12-Mev Deuterons" Phys. Rev. vol. 119, No. 6. Sep. 15, 1960. Lawrence Radiation Laboratory, University of California. pp. 1-8.
Goldberg, M.D., et al. "Angular Distributions of T(p, n)He3 Neutrons for 3.4- to 12.4-Mev Proto" Phys. Rev. 122, 1510—Published Jun. 1, 1961. Physical Review Journals Archive.
"The global fusion industry in 2024. The global fusion industry in 2024 Fusion Companies Survey by the Fusion Industry Association." pp. 1-48. US.
G. Serianni, et al., "Neutralisation and Transport of Negative Ion Beams: Physics and Diagnostics", New J. Phys. 19 045003 (2017). DOI: 10.1088/1367-2630/aa64bd.
J. Park, et al., "Experimental Observation of a Periodically Oscillating Plasma Sphere in a Gridded Inertial Electrostatic Confinement Device", Phys. Rev. Lett. 95, 015003 (2005). DOI: 10.1103/PhysRevLett.95.015003.
"Office Action-Non-Final" issued Oct. 10, 2024, in U.S. Appl. No. 17/148,489. Titled "Ion Transport" for Beam Alpha, Inc. USPTO. pp. 1-14.
"Amendment and Response After Final" filed Oct. 1, 2024, in U.S. Appl. No. 17/148,489. Titled "Ion Transport" for Beam Alpha, Inc. USPTO. pp. 1-14.
"Office Action—Final Rejection" issued Aug. 19, 2024, in U.S. Appl. No. 17/148,489. Titled "Ion Transport" for Beam Alpha, Inc. USPTO. pp. 1-12.
"Amendment and Response to Non-Final" filed May 15, 2024, in U.S. Appl. No. 17/148,489. Titled "Ion Transport" for Beam Alpha, Inc. USPTO. pp. 1-68.
"Voluntary Claims Amendment" for Canadian Patent Application No. 3,178,871. Titled: "Ion Source". Beam Alpha, Inc. Nov. 15, 2022. pp. 1-15. Canadian Intellectual Patent Office.
"Voluntary Claims Amendment" for European Patent Application No. 21822733.8. Titled: "Ion Source". Beam Alpha, Inc. Jan. 9, 2023. pp. 1-5. European Patent Office.
"Communication pursuant to Rules 161(2) and 162 EPC" for European Patent Application No. 21822733.8. Titled: "Ion Source". Beam Alpha, Inc. Jan. 20, 2023. pp. 1-3. European Patent Office.
"International Search Report" for PCT Patent Application No. PCT/US20/19449 Titled: "Direct Nuclear Power Conversion". Beam Alpha, Inc. Sep. 21, 2020. pp. 1-2. PCT International Searching Authority.
"Written Opinion of the International Searching Authority" for PCT Patent Application No. PCT/US20/19449 Titled: "Direct Nuclear Power Conversion". Beam Alpha, Inc. Sep. 21, 2020. pp. 1-9. PCT International Searching Authority.
"International Preliminary Report on Patentability" for PCT Patent Application No. PCT/US20/19449 Titled: "Direct Nuclear Power Conversion". Beam Alpha, Inc. Nov. 29, 2020. pp. 1-39. PCT International Searching Authority.
Ruggiero, "Nuclear fusion of protons with boron", Brookhaven National Lab,, No. BNL-47989; CONF-9209103--1, https://www.osti.gov/servlets/puri/6911764, 1992.
"Amendment and Response" for PCT Patent Application No. PCT/US20/19449 Titled: "Direct Nuclear Power Conversion". Beam Alpha, Inc., filed Oct. 27, 2020. pp. 1-19.
"Communication pursuant to Rules 70(2) and 70a(2) EPC" for European Application No. 20770753.0. Titled: "Direct Nuclear Power Conversion". Beam Alpha, Inc. Feb. 28, 2023. European Patent Office. pp. 1-1. Europe.
"Theory of Secondary Electron Emission by High-Speed Ions" by E.J. Sternglass published in Physical Review, vol. 108, issue No. 1, pp. 1-12 on Oct. 1, 1957.
"Electron Emission from Molybdenum Under Ion Bombardment" by J. Ferron et al. published in Journal of Physics D: Applied Physics, vol. 14, pp. 1707-1720 in 1981.
"Secondary Electron Yields from Clean Polycrystalline Metal Surfaces Bombarded by 5-20 keV Hydrogen or Noble Gas Ions" by P.C. Zalm and L.J. Beckers published in the Phillips Journal of Research, vol. 39, pp. 61-76 in 1984.
"Secondary Electron Emission Produced by Relativistic Primary Electrons" by A.A. Schultz and M.A. Pomerantz published in The Physical Review, vol. 130, issue No. 6, pp. 2135-2141 on Jun. 15, 1963.
"Response and Amended Claims" for European Application No. 20770753.0. Titled: "Direct Nuclear Power Conversion". Beam Alpha, Inc. Apr. 29, 2022. pp. 1-7. Europe.
"European Search Report" for European Application No. 20770753.0. Titled: "Direct Nuclear Power Conversion". Beam Alpha, Inc. Feb. 10, 2023. European Patent Office. pp. 1-9. Europe.
Jowett, J. M., Schaumann, M. and Versteegen, R., 'Heavy-Ion Operation of HL-LHC', The High Luminosity Large Hadron Collider, chapter 21, pp. 359-371, 2015.
"Invitation pursuant to Rule 63(1) EPC" for European Application No. 20770753.0. Titled: "Direct Nuclear Power Conversion". Beam Alpha, Inc. Oct. 12, 2022. European Patent Office. pp. 1-4. Europe.
"Amended Claims" for European Application No. 20770753.0. Titled: "Direct Nuclear Power Conversion". Beam Alpha, Inc. Dec. 22, 2022. pp. 1-7. Europe.
"Communication pursuant to Rules 161(2) and 162 EPC" for European Application No. 20770753.0. Titled: "Direct Nuclear Power Conversion". Beam Alpha, Inc. Dec. 20, 2021. European Patent Office. pp. 1-3. Europe.
"Amendment and Reply" for European Application No. 20770753.0. Titled: "Direct Nuclear Power Conversion". Beam Alpha, Inc. Sep. 11, 2023. European Patent Office. pp. 1-15. Europe.
"Examiner's Report" for Canadian Patent Application No. 3,131,901. Titled: "Direct Nuclear Power Conversion". Beam Alpha, Inc. Mar. 27, 2023. Canadian Intellectual Patent Office. pp. 1-5. Canada.
"Examiner's Report" for Canadian Patent Application No. 3,131,901. Titled: "Direct Nuclear Power Conversion". Beam Alpha, Inc. Feb. 15, 2024. Canadian Intellectual Patent Office. pp. 1-4. Canada.
Rider, "A General Critique of Inertial-Electrostatic Confinement Fusion Systems", Thesis, MIT Department of Nuclear Engineering, https://dspace.mit.edu/handle/1721.1/29869, 1991.
"Response to Examiner's Report" for Canadian Patent Application No. 3,131,901. Titled: "Direct Nuclear Power Conversion". Beam Alpha, Inc. Jul. 26, 2023. Canadian Intellectual Patent Office. pp. 1-79. Canada.
"Response to Examiner's Report" for Canadian Patent Application No. 3,131,901. Titled: "Direct Nuclear Power Conversion". Beam Alpha, Inc. Jun. 14, 2024. Canadian Intellectual Patent Office. pp. 1-32. Canada.
"Examination Report No. 1" for Australian Patent Application No. 2020233809. Titled: "Direct Nuclear Power Conversion". Beam Alpha, Inc. Oct. 5, 2022. IP Australia. pp. 1-3. Australia.

(56) References Cited

OTHER PUBLICATIONS

"Examination Report No. 2" for Australian Patent Application No. 2020233809. Titled: "Direct Nuclear Power Conversion". Beam Alpha, Inc. May 31, 2023. IP Australia. pp. 1-4. Australia.
"Response to Examiner's Report" for Australian Patent Application No. 2020233809. Titled: "Direct Nuclear Power Conversion". Beam Alpha, Inc. May 24, 2023. IP Australia. pp. 1-143. Australia.
"Response to Examiner's Report" for Australian Patent Application No. 2020233809. Titled: "Direct Nuclear Power Conversion". Beam Alpha, Inc. Aug. 2, 2023. IP Australia. pp. 1-145. Australia.
"Examination Report No. 3" for Australian Patent Application No. 2020233809. Titled: "Direct Nuclear Power Conversion". Beam Alpha, Inc. Aug. 10, 2023. IP Australia. pp. 1-4. Australia.
"Amendment and Response" for U.S. Appl. No. 17/433,924, Titled: "Direct Nuclear Power Conversion". Beam Alpha, Inc., filed Aug. 8, 2024. pp. 1-71.
"Office Action" for U.S. Appl. No. 17/433,924, Titled: "Direct Nuclear Power Conversion". Beam Alpha, Inc., mailed Nov. 1, 2023. pp. 1-51.
"Office Action" for U.S. Appl. No. 17/433,924, Titled: "Direct Nuclear Power Conversion". Beam Alpha, Inc., mailed Feb. 8, 2024. pp. 1-46.
"International Search Report" for PCT Patent Application No. PCT/US21/36092 Titled: "Sulfur Blanket". Beam Alpha, Inc. Mar. 4, 2022. pp. 1-2. PCT International Searching Authority.
"Written Opinion" for PCT Patent Application No. PCT/US21/36092 Titled: "Sulfur Blanket". Beam Alpha, Inc. Mar. 4, 2022. pp. 1-9. PCT International Searching Authority.
"International Preliminary Report on Patentability" for PCT Patent Application No. PCT/US21/36092 Titled: "Sulfur Blanket". Beam Alpha, Inc. Mar. 4, 2022. pp. 1-6. PCT International Searching Authority.
"Extended European Search Report" for European Application No. 21854417.9. Titled: "Sulfur Blanket". Beam Alpha, Inc. Apr. 17, 2024. European Patent Office. pp. 1-7. Europe.

* cited by examiner

ION SOURCE

I. PRIORITY

This application claims the benefit of U.S. Provisional Patent Application No. 63/036,073, Titled: "Ion Source," filed Jun. 8, 2020. This U.S. Provisional Patent Application No. 63/036,073 is hereby incorporated by reference in its entirety as if fully restated herein.

II. BACKGROUND

Existing ion sources may not be optimized for applications wherein very high peak ion beam current is required while simultaneously presenting the downstream particle accelerator with gas loads consistent with ultra-high vacuums found in such particle accelerators. In most cases large vacuum pumps are required to between the ion source and downstream particle accelerator. Accordingly, there is a need for improvement over such past approaches and to provide alternatives to such as the above.

Ion sources suitable for nuclear fusion applications have not enjoyed extensive research and development efforts by of those of ordinary art in the field of accelerator physics. The nuclear fusion of deuterium nuclei is taught in U.S. Provisional Patent Application No. 62/995,168 filed Jan. 14, 2020 and titled "Transient Beam Compression Fusion" by the applicant of this instant application. Provisional patent 62/995,168 is incorporated by reference into this instant application. U.S. Utility patent application Ser. No. 17/148, 489 filed Jan. 13, 2021 and titled "Ion Transport" claims priority benefit from provisional patent 62/995,168. Patent application Ser. No. 17/148,489 is incorporated by reference into this instant application.

In addition, the nuclear fusion of deuterium nuclei and the amplification of energy release due to neutron moderation and absorption in a working fluid is taught in U.S. Provisional Patent Application No. 63/070,587 filed Aug. 26, 2020 and titled "Mixed Nuclear Power Conversion" by the applicant of this instant application. Patent application 63/070,587 is incorporated by reference into this instant application.

Ion sources for aneutronic nuclear fusion channels, such as protons colliding with boron-11 nuclei, have also not been developed sufficiently. This particular channel is taught in PCT Application PCT/US20/19449 filed Feb. 24, 2020 and titled "Direct Nuclear Power Conversion" by the applicant of this instant application. PCT application PCT/US20/19449 is incorporated by reference into this instant application.

III. SUMMARY

The disclosure below uses different prophetic embodiments to teach the broader principles with respect to articles of manufacture, apparatuses, processes for using the articles and apparatuses, processes for making the articles and apparatuses, and products produced by the process of making, along with necessary intermediates, directed to nuclear power multiplication and conversion.

This Summary is provided to introduce the idea herein that a selection of concepts is presented in a simplified form as further described below. This Summary is not intended to identify key features or essential features of subject matter, nor this Summary intended to be used to limit the scope of claimed subject matter. Additional aspects, features, and/or advantages of examples will be indicated in part in the description which follows and, in part, will be apparent from the description, or may be learned by practice of the disclosure.

References sited herein are incorporated by reference as if fully stated herein. The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

With the foregoing in mind, consider an apparatus (method of making, method of using) including an ion source [002] designed to emit intense pulses of ions in the form of a tightly collimated ion beam [016]. This source simultaneously exposes a particle accelerator [004] downstream of the ion source [002] with very little background gas, consistent with ultra-high vacuum systems.

IV. INDUSTRIAL APPLICABILITY

Industrial applicability is representatively directed to that of apparatuses and devices, articles of manufacture—particularly electrical—and processes of making and using them. Industrial applicability also includes industries engaged in the foregoing, as well as industries operating in cooperation therewith, depending on the implementation.

V. DRAWINGS

In the non-limiting examples of the present disclosure, please consider the following:

VI. DETAILED DISCLOSURE OF MODES

Figure 2:
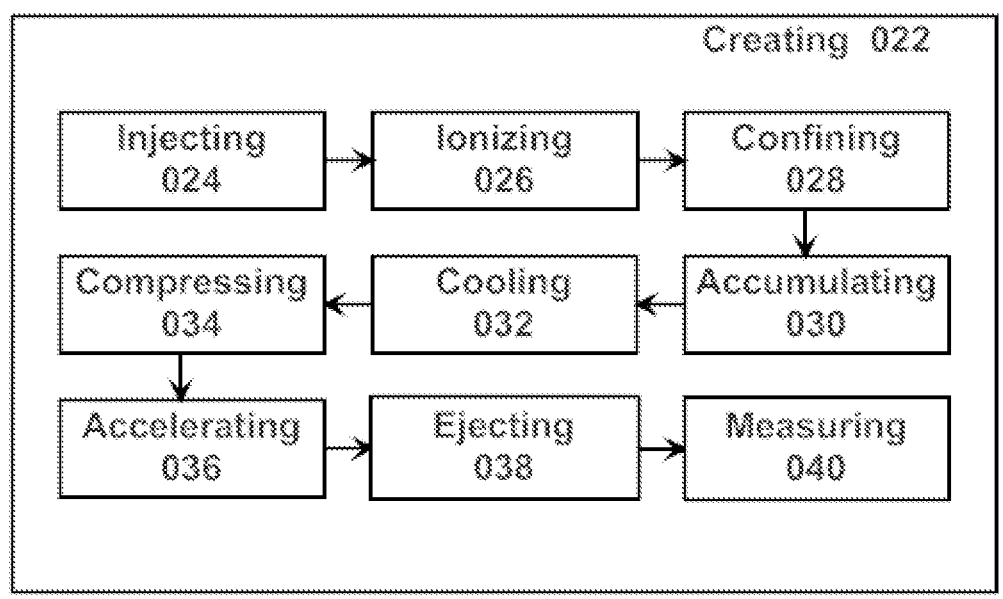
FIG. 2 is an illustration of the steps of one embodiment of creating [022] an ion beam [016] in an ion source [002].
Figure 3:
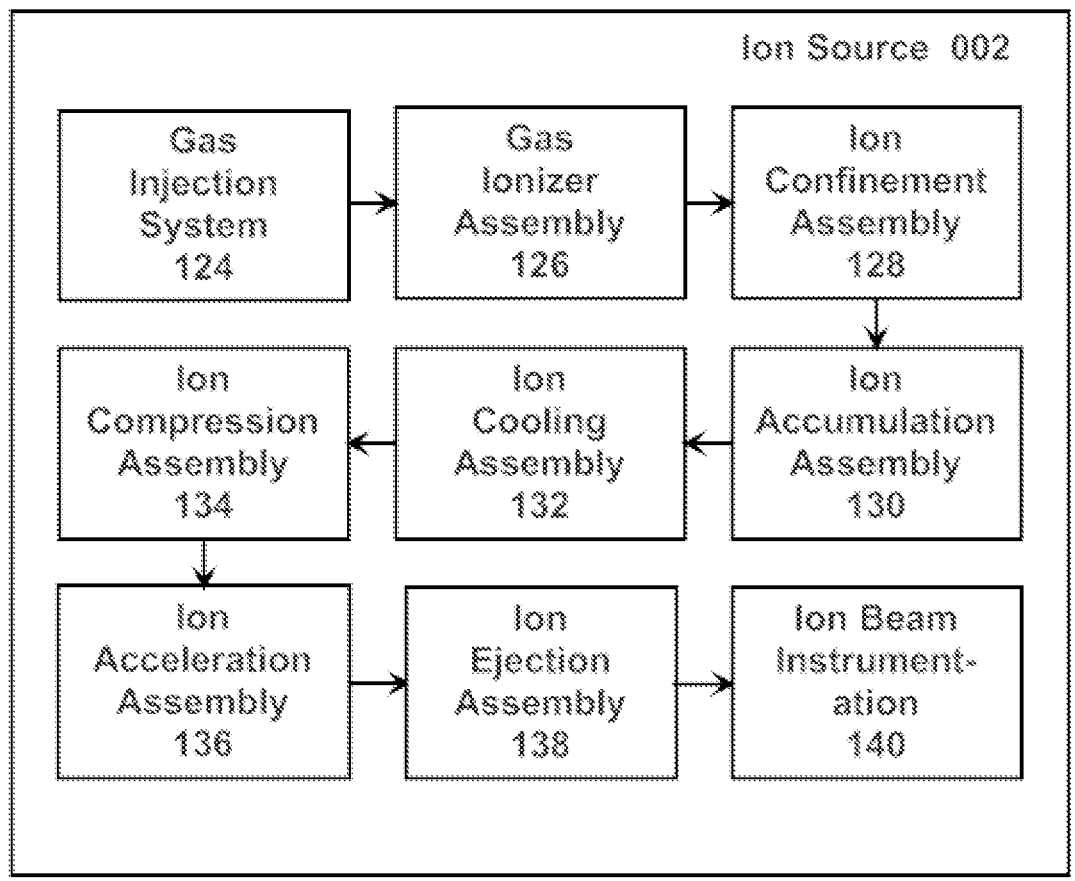
FIG. 3 is an illustration of the systems and assemblies comprising one embodiment of an ion source [002].

The following detailed description is directed to concepts and technologies for creating [022] an ion beam [016] in the form of short bunches, high intensity, low longitudinal emittance, and low transverse emittance, teaching by way of prophetic illustration. As illustrated in FIG. 3, the disclosure includes an apparatus to create an ion beam [016], the apparatus comprising: a gas injection system [124] that accepts injected gas; a gas ionizer assembly [126] that ionizes [026] at least some of said injected gas, said gas ionizer assembly [126] forming ions; an ion confinement assembly [128], confining [028] at least some of said ions without the use of magnetic fields; an ion accumulation assembly [130], accumulating [030] at least some of said accumulated ions; an ion cooling assembly [132], cooling [032] at least some of said accumulated ions; an ion compression assembly [134], compressing [034] at least some of said accumulated ions without the use of magnetic fields; an ion acceleration assembly [136], accelerating [036] at least some of said accumulated ions; an ion ejection assembly [138], ejecting [038] at least some of said accelerated ions; and ion beam instrumentation [140], measuring [040] properties of said ejected ions. Similarly, as illustrated in FIG. 2 the following disclosure teaches a method of creating [022] an ion beam [016], the method comprising: injecting [024] gas, accepting injected gas; ionizing [026] at least some of said injected gas, forming ions; confining [028] at least some of said ions without the use of magnetic fields; accumulating [030] at least some of said confined ions; cooling [032] at least some of said accumulated ions; compressing [034] at least some of said accumulated ions without the use of magnetic fields; accelerating [036] at least some of said accumulated ions; ejecting [038] at least some of said accelerated ions; and measuring [040] properties of said ejected ions. These are indicative of how to make and use such an apparatus as well as necessary intermediates and products produced by the methods.

Figure 1:
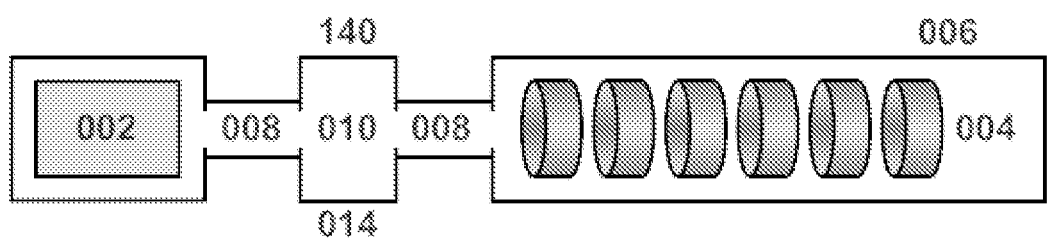
FIG. 1 is an illustration of one embodiment of an ion source [002] connection to a particle accelerator [004].

FIG. 1 contains an illustration of an ion source [002] connection to a particle accelerator [004]. The ion source [002] and particle accelerator [004] share the same vacuum chamber [006], except when an intermediate vacuum gate valve [010] is closed, e.g., during maintenance. In some embodiments the ion source [002] and particle accelerator [004] are separated by said vacuum gate valve [006], beam transfer lines [008], ion beam instrumentation [140], and ion beam control devices [014]. Note that this aspect of the disclosure teaches an apparatus that does not degrade the vacuum in a downstream particle accelerator by emitting excessive levels of background gas.

A. Injecting [024] Gas into the Ion Source [002]

An intense charged particle beam such as an ion beam [016] has a high particle density in all six dimensions of phase space; horizontal position, horizontal angle, vertical position, vertical angle, bunch length, and energy spread. According to Liouville's theorem, the shape of a beam's phase space can be affected by electromagnetic fields, but not the volume or density. This is somewhat analogous to focusing a laser beam, wherein the spot size of the beam can be reduced by increasing the divergence of the beam at that spot. The volume of beam phase space is quantified by the parameter emittance.

There are many techniques employed by accelerator physicists to change particle beam phase space density, all of which rely on the fact that a beam is composed of individual particles and not a uniformly filled volume. Simon van der Meer, the inventor of one such technique called stochastic cooling, was awarded the Nobel Prize in 1984 for that innovation. Another common technique is called electron cooling, wherein a hot ion beam [016] is put in thermal communication with a cold electron beam, removing the heat (large emittance) from the ion beam [016] and transferring it to the cold (small emittance) electron beam.

Figure 4:
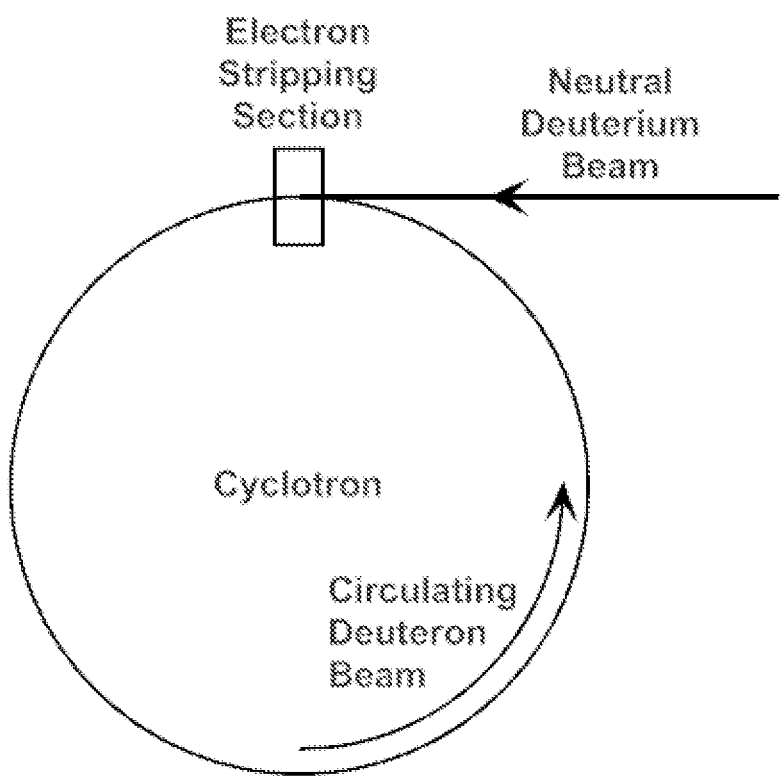
FIG. 4 is an illustration of charge exchange injection of a deuteron beam into a cyclotron. The deuteron beam can be replaced by either a hydrogen or boron-11 beam to create circulating proton or boron-11 nuclei beams, respectively.

The most prevalent of these techniques is called charge exchange injection. Without charge exchange injection, the injection of a positively charged deuteron beam into a cyclotron would limit the electrical current circulating in the cyclotron to the injected beam current. The maximum pulse length of the injected deuteron beam is equal to the circumference of the cyclotron beam trajectory. FIG. 4 contains an illustration of charge exchange injection. In this illustrated embodiment, a neutral deuterium beam with a pulse length N times longer than the deuteron [228] beam circumference within the cyclotron is injected. After injection, the phase space density of the deuteron [228] beam can be N times higher than that of the neutral deuterium beam. Enabling charge exchange injection is an electron stripping section within a magnetic field bending the positively charged deuteron beam. Electron stripping can be accomplished with thin foils, intense electron or laser beams, intense magnetic fields, or a combination of some or all above. By stripping away electrons (relying on the fact that the beam is composed of discrete particles), phase space density is increased.

In a similar embodiment, a boron-11 ion beam composed of singly-ionized boron-11 [240] ions undergoes charge exchange injection to store a fully-stripped boron-11 nuclei [240] beam in the cyclotron. Alternatively, a compound comprising boron-11 nuclei [240] undergoes charge exchange injection to store a fully-stripped boron-11 nuclei [240] beam in the cyclotron. In another embodiment, a negatively charged hydrogen beam undergoes charge exchange injection to store an intense proton [236] beam in the cyclotron.

When using foils, each subsequent pass of the deuteron [228] beam through the foil causes the deuteron [228] beam to scatter, progressively reducing the phase space density. Therefore, in this illustrated embodiment, making the neutral deuterium beam with a high phase space density is useful where a very high electrical beam current is desired in the cyclotron. The same is true for both hydrogen [236] and boron-11 nuclei [240] (or compound comprising boron-11 nuclei [240]) substituting for deuterium gas containing deuterons [228].

Figure 5:
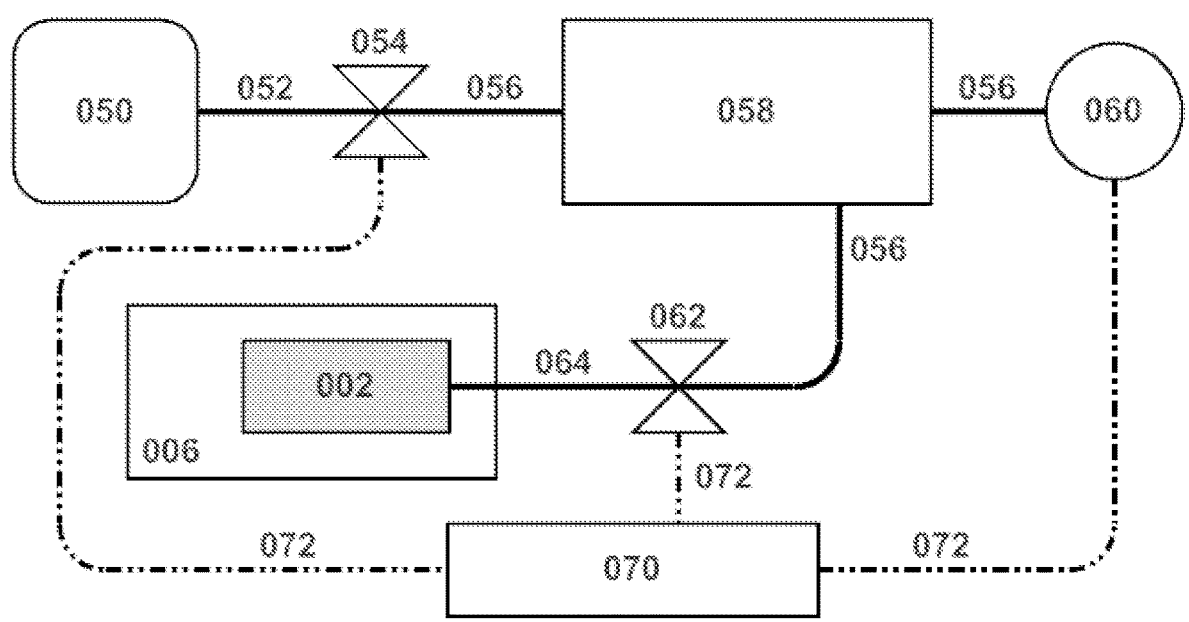
FIG. 5 is an illustration of an embodiment for controlled release of pressurized gas into an ion source [002].

FIG. 5 illustrates an embodiment with controlled release of pressurized gas into an ion source [002]. In this embodiment, a controller [070] determines the pulse length and quantity of injected gas into the ion source [002].

In this embodiment the gas which is to be injected is stored in a pressurized gas container [050]. In the case of deuterium gas, this pressurized gas container [050] and all of the subsequent components of the gas injection system [124] (everything in FIG. 5 except for the ion source [002] itself and associated vacuum chamber [006]) can be operated over a wide range of temperatures, e.g., from 20° K to over 1000° K. Alternatively, in the case of creating [022] a boron-11 nuclei [240] beam, a compound such as boron hydride, or at least some boron hydride, can be used when the gas injection system [124] is maintained at a temperature above, e.g., 181° K. In this latter case, the hydrogen nuclei [236] are removed from the gas injection system [124] after the step of ionizing [026] is essentially complete. Alternatively the ionized hydrogen gas can be redirected to form a separate proton [236] beam.

High pressure tubing [052] directs gas from the pressurized gas container [050] to a high pressure fast valve [054]. In some embodiments, the high pressure fast valve [054] is also composed of a pressure regulator. The high pressure fast valve regulates the gas pressure in a low pressure gas reservoir [058]. Low pressure tubing [056] connects the high pressure fast valve [054] to the low pressure gas reservoir [058]. The controller [070] utilizes a low pressure gauge [060] and knowledge of the inside diameters and lengths of the high pressure tubing [052] and low pressure tubing [056] to control the frequency and duration of gas flow through the high pressure fast valve [054].

The frequency and duration of gas flow through a low pressure fast valve [062] is determined by the needs of the downstream particle accelerator [004]. Each time the low pressure fast valve [062] opens the pressure in the low pressure gas reservoir [058] is reduced. The intensity of the gas particles during injecting [024] into the ion source [002] is determined by the pressure in the low pressure gas reservoir [058]. Thus, the pressure in the low pressure gas reservoir [058] is regulated by the controller [070].

Controller [070] communicates via signal connections [072] with the low pressure gauge [060], the high pressure fast valve [054], and the low pressure fast valve [062]. In some embodiments the signal connections [072] are electrical wires, while in other embodiments the signal connections [072] are wireless. In some embodiments the form of communication along the signal connections [072] is digital, while in other embodiments the form of communication along the signal connections [072] is analog. There are embodiments wherein combinations of wired and wireless signal connections [072] are employed. There are embodiments wherein combinations of analog and digital communication are employed along the signal connections [072].

Between the low pressure fast valve [062] and the ion source [002] is gas tubing [064] that terminates in the ion source [002] with a supersonic gas nozzle [066]. The gas tubing [064] length and inside diameter, and the supersonic gas nozzle [066] shape, can be optimized to minimize the divergence of the gas during injecting [024]. Large injected gas divergence and highly scattered gas particles lead to excessive vacuum degradation in the downstream particle accelerator [004].

B. Ionizing [026] Gas in the Ion Source [002]

Figure 6:
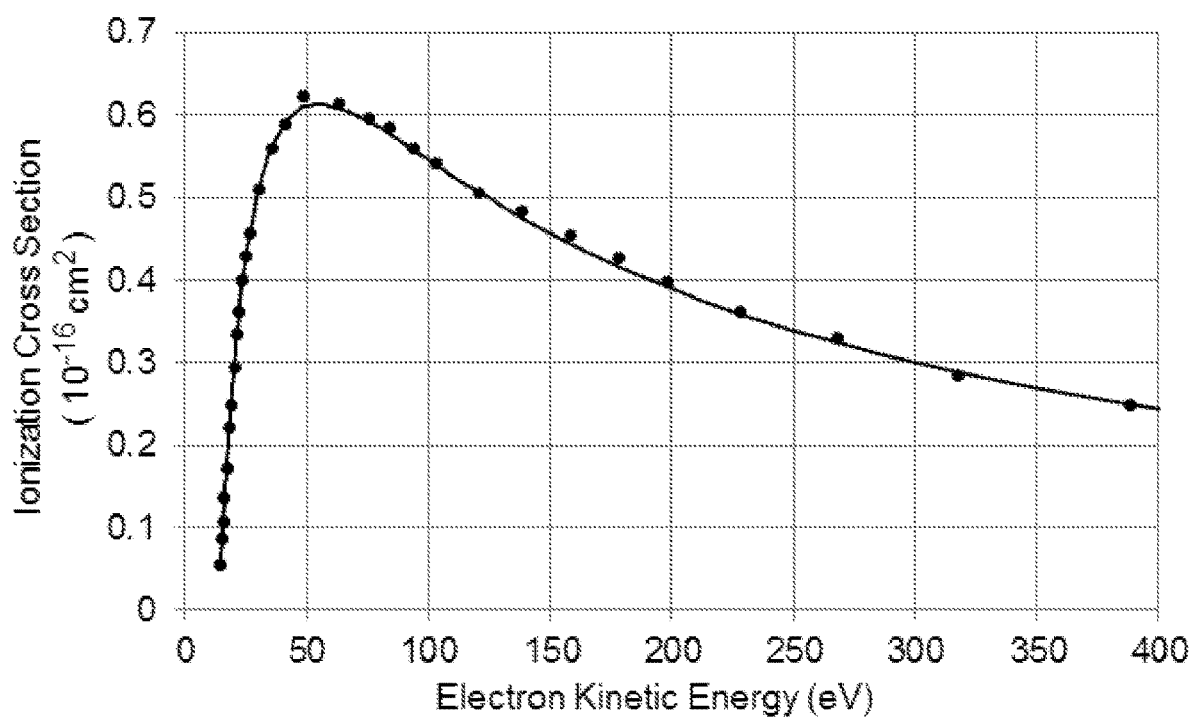
FIG. 6 is a plot of published measurements and models of total ionization cross section of neutral atomic hydrogen (or deuterium) as a function of stripping electron [086] kinetic energy.

Electron bombardment ionization is a method by which electrons orbiting nuclei are stripped from the nuclei by incident energetic electrons. Similar to other areas in physics wherein the probability of a collision event occurring, this probability is quantified by the collision cross section. The cross section for an energetic electron stripping the electron from a hydrogen or deuterium atom is plotted in FIG. 6. First, note that the measured data points [reproduced from M. B. Shah, et al., J. Phys. B 20, 3501 (1987)] and the model curve [Y.-K. Kim and M. E. Rudd, Phys. Rev. A 50, 3954 (1994)] are in good agreement. Second, note that the cross section for ionizing atomic hydrogen to form free protons [236], or the cross section for ionizing atomic deuterium to form free deuterons [228], peaks at incident electron kinetic energies of approximately 50 eV. Third, note that deuterium atoms can be ionized over a very broad range of incident electron kinetic energy.

Figure 7:
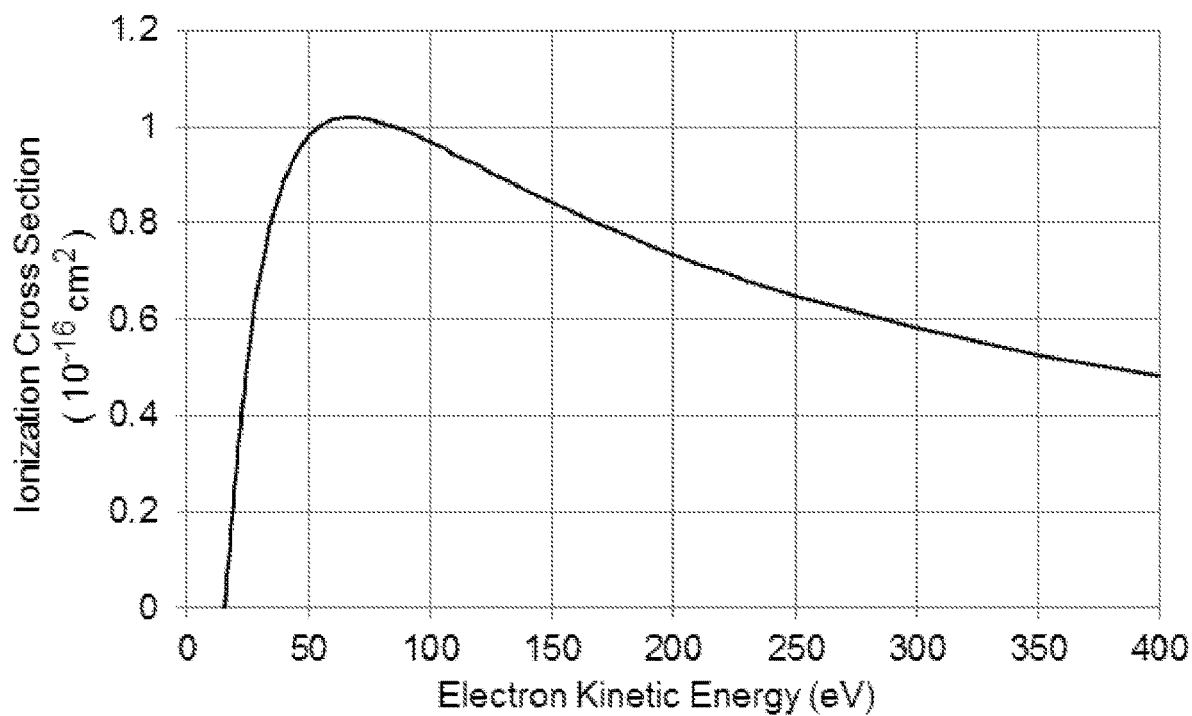
FIG. 7 is a plot of published measurements and models of total ionization cross section of neutral molecular hydrogen (or deuterium) as a function of stripping electron [086] kinetic energy.

The cross section for an energetic electron ionizing a hydrogen or deuterium molecule is plotted in FIG. 7. First, note that though not shown, the measured data points agree well with the plotted model curve [Y.-K. Kim and M. E. Rudd, Phys. Rev. A 50, 3954 (1994)]. Second, note that though the peak cross section for molecular ionization is almost double that of atomic ionization, the shape of the curve is very similar. On the basis of this similarity, the gas ionizer assembly [126] of the ion gun [002] can ionize both the molecular and atomic forms of deuterium or hydrogen. For higher atomic number atoms and molecules, such as vaporized boron or boron hydride (each composed of boron-11 nuclei [240]), the situation is similar though the peak electron energy increases for progressively higher ionization states.

The electron flux to fully ionize a given fraction of gas injected [024] from the gas injection system [124] can be calculated from these cross section curves. In an embodiment wherein the amount of energy indicated to create [022] and ion beam [016] is minimized, it is desirable to create an incident electron beam circuit in which the incident electrons are born, accelerated, ionize, then decelerated, and finally collected at a voltage very near the voltage at which they were born. Since power equals electrical current (dictated by full ion beam [016] ionizing [026] time voltage, low power indicates low differential voltage between the incident electrons at birth and when collected.

One elegant embodiment of such an electron current was invented by Philo T. Farnsworth, the inventor of television. In his case, a spherically converging electron beam was utilized to induce fusion events. His device, called the Fusor, was the subject of U.S. Pat. No. 3,258,402 filed Jan. 11, 1962 titled "Electric Discharge Device for Producing Interactions between Nuclei" and U.S. Pat. No. 3,386,883 filed Jun. 4, 1966 titled "Method and Apparatus for Producing Nuclear-Fusion Reactions". Both of the patents are incorporated by reference as if as if fully stated herein. The Fusor belongs to a class of nuclear fusion reactors called Electrostatic Inertial Confinement ("EIC").

In the case of the Fusor, a spherical vacuum chamber accelerates electrons radially inward due to a positively charged anode within the spherical chamber wherein this spherical anode is permeable to electrons. Once electrons pass through the anode, they see the radial space charge force due to the spherically symmetric electron charge distribution near the center. This repulsive force slows down entering electrons, decreasing their radial kinetic energy until all of the kinetic energy at the radius of the anode is converted into electrostatic potential energy. The radius near which most of the electrons thereby stop their radial motion is called a virtual cathode. Electrons at the virtual cathode then accelerate radially outward until they are again collected near the spherical chamber wall where the electrons were originally born.

The equations that dictate the formation of a virtual cathode in a spherically symmetric system also indicate the existence of a virtual cathode in cylindrically symmetric systems. In one embodiment of the gas ionizer assembly [126] illustrated in FIG. 8, stripping electrons [086] converge radially toward the common radial axis of an outer cylindrical electron cathode [080] and inner electron-permeable anode [082]. Due to the mutual electrostatic repulsion of the radially converging stripping electrons [086], the stripping electrons [086] decelerate and form a hollow virtual cathode [084]. The shaded region inside of the electron cathode [080] is the region in which the stripping electrons [086] are capable of ionizing [026] injected [024] gas.

Figure 8:
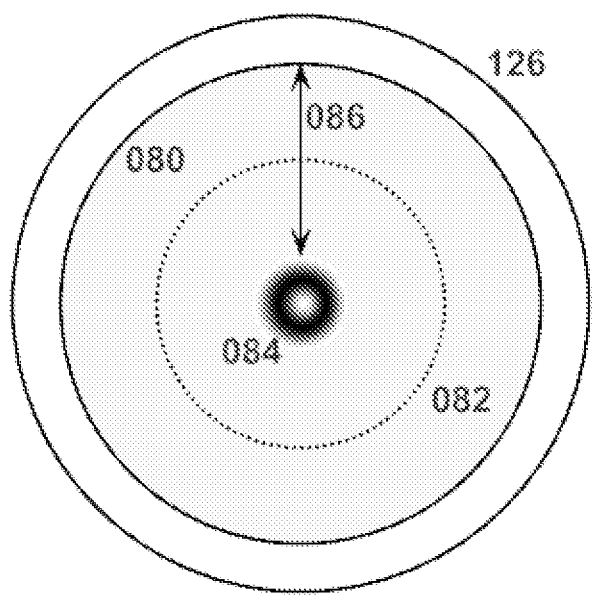
FIG. 8 is an illustration of coaxial inertial electrostatic confinement produced by a radially converging electron beam in a azimuthally symmetric cylindrical geometry viewed from the end.
Figure 9:
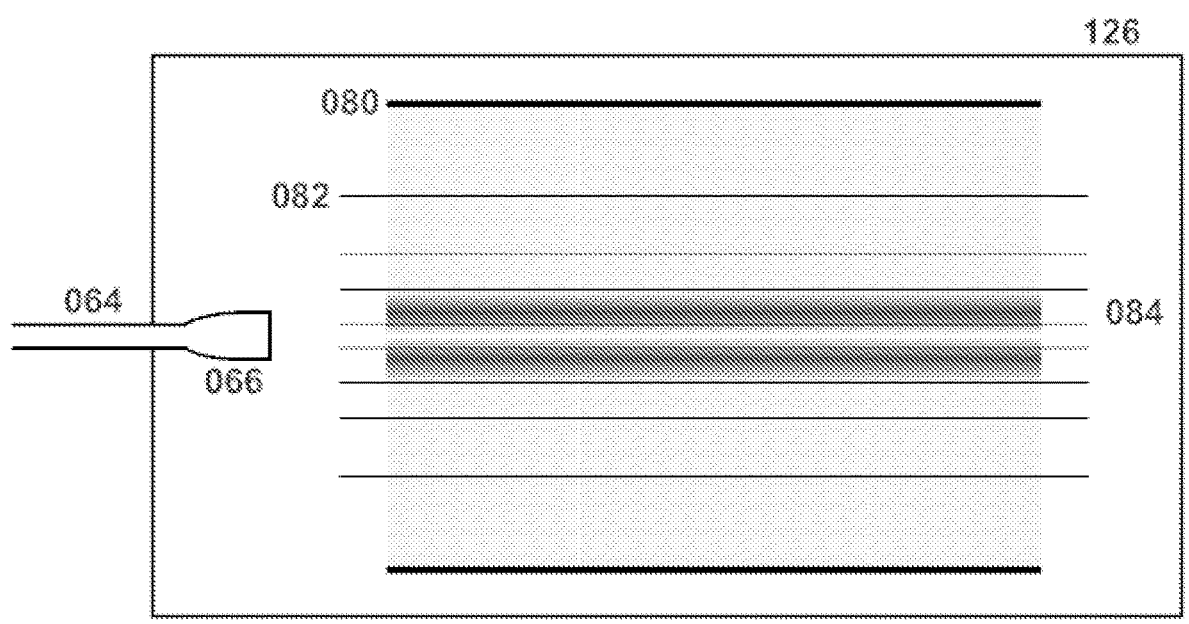
FIG. 9 is an illustration of coaxial inertial electrostatic confinement produced by a radially converging electron beam in a azimuthally symmetric cylindrical geometry viewed from the side, the geometry one embodiment of gas ionizer assembly [126].

While FIG. 8 is the view of the gas ionizer assembly [126] along its cylindrical axis, FIG. 9 is an illustration of the gas ionizer assembly [126] side cross section. In this embodiment the electron permeable anode [082] uses an array of azimuthally arranged wires at a common radius. Again, the shaded region inside of the boundaries of the electron cathode [080] is the region in which the stripping electrons [086] are capable of ionizing [026] injected [024] gas. In this view, the tubing [064] from the low pressure fast valve [062] of the gas injection system [124] is shown along with its accompanying supersonic gas nozzle [066]. In an embodiment wherein the length of the gas ionizer assembly [126] is long compared to the radius of the hollow region within the virtual cathode [084], the probability of a gas molecule traversing the gas ionizer assembly [126] without being ionized [026] is exceedingly low. The supersonic gas nozzle [066] can be used to minimize the number of gas molecules that are launched with large enough divergence to avoid the shaded region and traverse the outside periphery around the electron cathode [080].

The radius of the hollow region inside of the virtual cathode [084] depends on the voltage between the electron cathode [080] and the electron permeable anode [082] generated by one or more high voltage power supplies [076]. The higher the voltage difference, the smaller the radius. The radius of the virtual cathode [084] also depends on the radial stripping electron [086] beam intensity. This intensity can be dramatically increased by adjusting the amount of background gas within the electron cathode [080], wherein the background gas is ionized by the radial electric field between the electron cathode [080] and electron permeable anode [082]. In one embodiment, the amount of background gas is increased by emitting gas from the supersonic gas nozzle [066] a determined amount of time before the electrical voltage between the electron cathode [080] and electron permeable anode [082] is applied by a high voltage power supply [076].

C. Confining [028] Ions in the Ion Source [002]

Once some gas is injected [024] and ionized [026], the stripped atomic electrons that once orbited the gas nuclei will be repelled by the space charge of the stripping electrons [086] and be collected by the electron cathode [080], leaving behind positively charged gas nuclei. These positive ions are radially confined by the same negative space charge potential that repelled their former orbiting electrons. As the density of positive ions increases along the axis within and inside the virtual cathode [084], the smaller the virtual cathode [084] radius becomes. This is because some of the electrostatic potential generated by the negatively charged stripping electrons [086] is counteracted by the positively charge ion population, allowing the stripping electrons [086] to stop their radial motion at a smaller radius.

Figure 10:
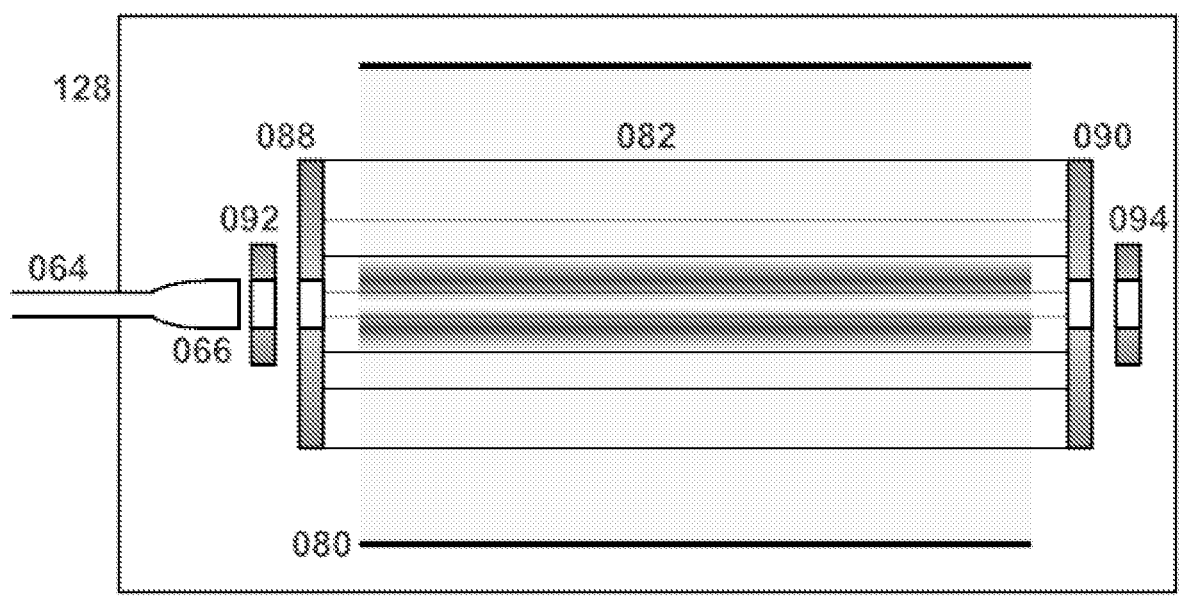
FIG. 10 is an illustration of one embodiment of an ion confinement assembly [128].

The issue is then longitudinal confinement along the axis of the ion confinement assembly [128]. In one embodiment illustrated in FIG. 10, the ion confinement assembly [128] can occupy the same region as the gas ionizing assembly [126] with the addition of four components. First, a conductive upstream anode end cap [088] and conductive downstream anode end cap [090] are attached to the ends of the wires forming the electron permeable anode [082]. These anode end caps [088,090] are at the same voltage as the wires themselves. These two anode end caps [088,090] along with the attached wire form a Faraday cage wherein the electrostatic potential from external conductors is zero. The anode end caps [088,090] have holes to allow passage of ion beams [016] on the downstream end and injected [024] gas on the upstream end. Second, upstream confinement electrode [092] and downstream confinement electrode [094] are placed outside of the upstream anode end cap [088] and downstream end cap [090], respectively. The confinement electrodes [092,094] also have holes to allow passage of ion beams [016] on the downstream end and injected [024] gas on the upstream end. If the voltage of the confinement electrodes [092,094] is more positive than the anode end caps [088,090], the ion beam [016] within the ion confinement assembly [128] is longitudinally confined.

Note that in the embodiments presented herein there is no applied magnetic field used to confine the ions within the ion confinement assembly [128] while confining [028] ions.

D. Accumulating [030] Ions in the Ion Source [002]

Figure 11:
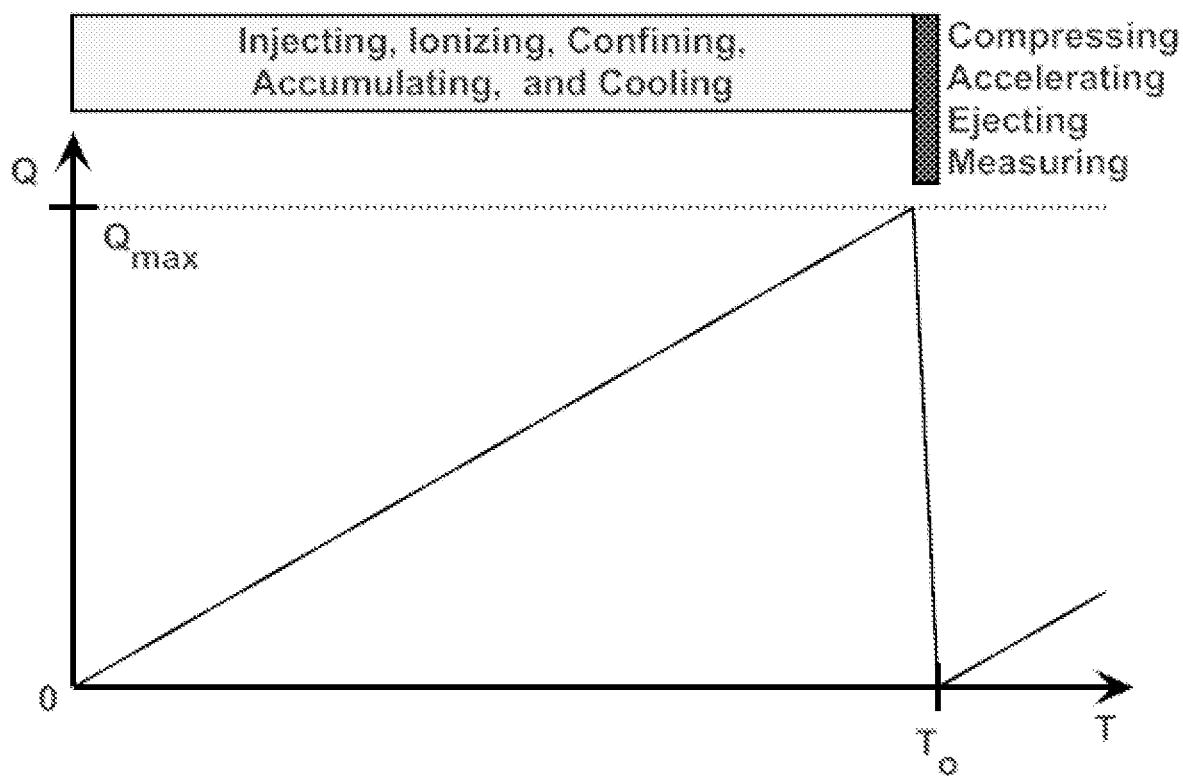
FIG. 11 is an illustration of one embodiment of the ion source [002] timeline for accumulating [030] an ion beam [016].

The total charge Q of the confined [028] ion beam [016] increases by continuously accumulating [030] more ions. In one embodiment the downstream particle accelerator [004] uses a pulse of ion beam [016], of total charge $Q_{max}$, each time interval $T_o$. The creating [022] timeline associated with this embodiment is illustrated in FIG. 11. Note that the ion source [002] is continuously preparing an ion beam [022] during the time between the process ejecting [038] into the downstream particle accelerator [004]. During this period injecting [024], ionizing [026], confining [028], accumulating [030], and cooling [032] the total ion beam [022] charge Q is increasing. The processes of compressing [034], accelerating [036], ejecting [038], and measuring [040] all utilize a time period that is short compared to the time $T_o$ between ejecting [038] events.

In one embodiment, the ion confinement assembly [128] also serves as the ion accumulation assembly [130]. As the total charge Q within the ion confinement assembly [128] increases, optimization of ion beam [022] confining [028] indicates different stripping electron [086] kinetic energies and electrical currents, and different longitudinal confinement voltages. Therefore accumulating [030] differs from confining [028] because of electrical voltage and current modifications during the period of charge Q accumulation within the ion source [002].

Figure 12:
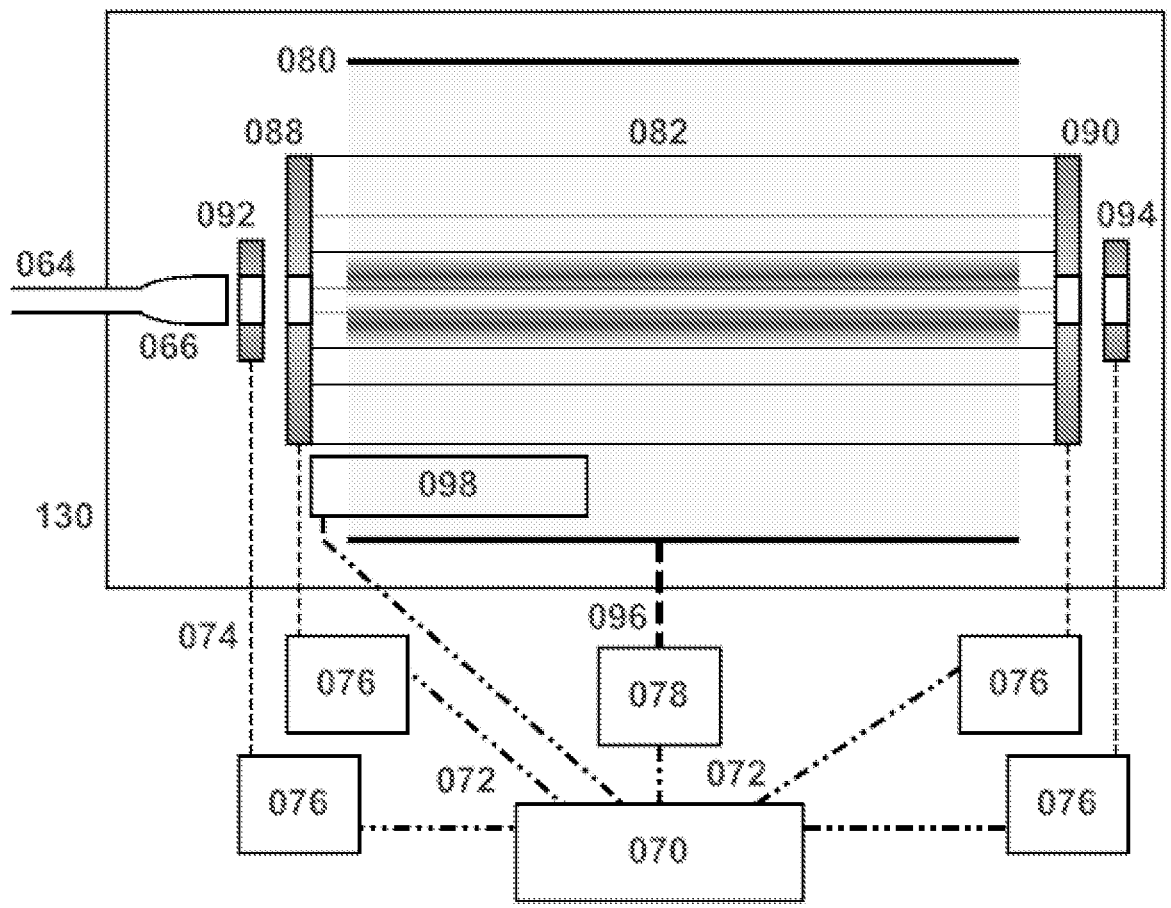
FIG. 12 is an illustration of one embodiment of an ion accumulation assembly [130].

FIG. 12 contains an illustration of this embodiment wherein electrical voltages and currents are modified by the controller [070], the modifications at least partially guided by measurements of the stripping electrons [086], virtual cathode [084], and accumulated ion beam [022] within the ion accumulation assembly [130]. These measurements are performed by diagnostic sensors [098] that communicate the measurements to the controller [070] via one or more signal connections [072]. High voltage power supplies [076] and a heater power supply [078] are all controlled by the controller [070] via signal connections [072].

In some embodiments the signal connections [072] are electrical wires, while in other embodiments the signal connections [072] are wireless. In some embodiments the form of communication along the signal connections [072] is digital, while in other embodiments the form of communication along the signal connections [072] is analog. There are embodiments wherein combinations of wired and wireless signal connections [072] are employed. There are embodiments wherein combinations of analog and digital communication are employed along the signal connections [072].

There are separate high voltage power supplies [076] connected via high voltage conductors [074] to the upstream anode end cap [088] and downstream anode end cap [090] due to beam manipulations foreseen in the steps of compressing [034] and accelerating [036]. During the period of accumulating [030] these two high voltage power supplies [076] are set to the same voltage or one of the high voltage power supplies [076] is isolated from the circuit.

There are separate high voltage power supplies [076] connected via high voltage conductors [074] to the upstream confinement electrode [092] and downstream confinement electrode [094] due to beam manipulations foreseen in the steps of compressing [034] and accelerating [036]. During the period of accumulating [030] these two high voltage power supplies [076] are set to the same voltage or one of the high voltage power supplies [076] is isolated from the circuit.

The stripping electron [086] electrical current is in part determined by the voltage between the electron cathode [080] and the electron permeable anode [082] and on the temperature of the electron cathode [080] surface facing radially inward. This temperature is controlled by a heater power supply [078] connected to the electron cathode [080] with a high current conductor [096].

E. Cooling [032] Ions in the Ion Source [002]

In some embodiments, it is desirable to cool the random radial and longitudinal motion of the ions within the ion accumulation assembly [130]. Reducing these random radial and longitudinal velocities reduces the transverse (horizontal and vertical motion in the radial direction) and longitudinal (motion along the cylindrical axis) emittances. Two types of ion cooling are indicated by accelerator physics and the particular requirements within an ion source [002]. The first is electron cooling; in view of the electrons are already being part of the ion accumulation assembly [130]. The second is that the rate of emittance reduction (and hence minimum attainable emittances for a given ion heating mechanism) is independent of the total ion beam [022] charge Q within the ion accumulation assembly [130].

In some embodiments, the ion accumulation assembly [130] also acts as the ion cooling assembly [132] by the addition of additional components and capabilities. In an exemplary teaching, a longitudinal electron beam within the virtual cathode [084] can be added to provide additional electron cooling for longitudinal ion motion.

The second ion cooling technology is stochastic cooling. Stochastic cooling uses beam detectors to repeatedly measure the average positions (horizontal, vertical, and longitudinal) of the ion beam [022]. These average positions fluctuate because there are a finite number of ions within the ion accumulation assembly [130], yielding measurement fluctuations with scale as the square root of Q.

In the transverse direction the ratio of image charges on the electron permeable anode [082] wires are used to measure position ion in one embodiment. A pattern of voltages on individual wires are then be used to repeatedly correct these measured position fluctuations, thereby reducing the emittance of the ion beam [022]. In the longitudinal direction the ratio of image charges on the upstream anode end cap [088] and downstream anode end cap [090] provides the longitudinal position measurement. The application of differential voltage between the upstream anode end cap [088] and downstream anode end cap [090] provides the correction that reduces the longitudinal emittance.

F. Compressing [034] Ions in the Ion Source [002]

When it is time to start ejecting [038] the ion beam [022] from the ion source [002], the relatively long ion beam [022] within the ion accumulation assembly [130] can be shortened in order to match the ion beam [022] pulse length needed by the downstream particle accelerator [004]. This shortening of the ion beam [022] pulse length is the step of compressing [034].

In one embodiment, the wires comprising the electron permeable anode [082] are highly resistive due to their very small diameter and their material composition. In an exemplary teaching, the wires are composed of nichrome or carbon nanotubes. The process of compressing begins with the controller [070] instructing the high voltage power supplies [076] to produce a voltage difference between the upstream anode end cap [088] and the downstream anode end cap [090], driving the ion beam [022] within the ion accumulation assembly [130] to pile up near the downstream anode end cap [090]. The controller [070] also instructs the high voltage power supply [076] connected to the downstream confinement electrode [094] to provide a voltage that prevents the ion beam [022] from escaping the ion accumulation assembly [130]. In this embodiment the ion accumulation assembly [130] also serves as the ion compression assembly [134].

Figure 13:
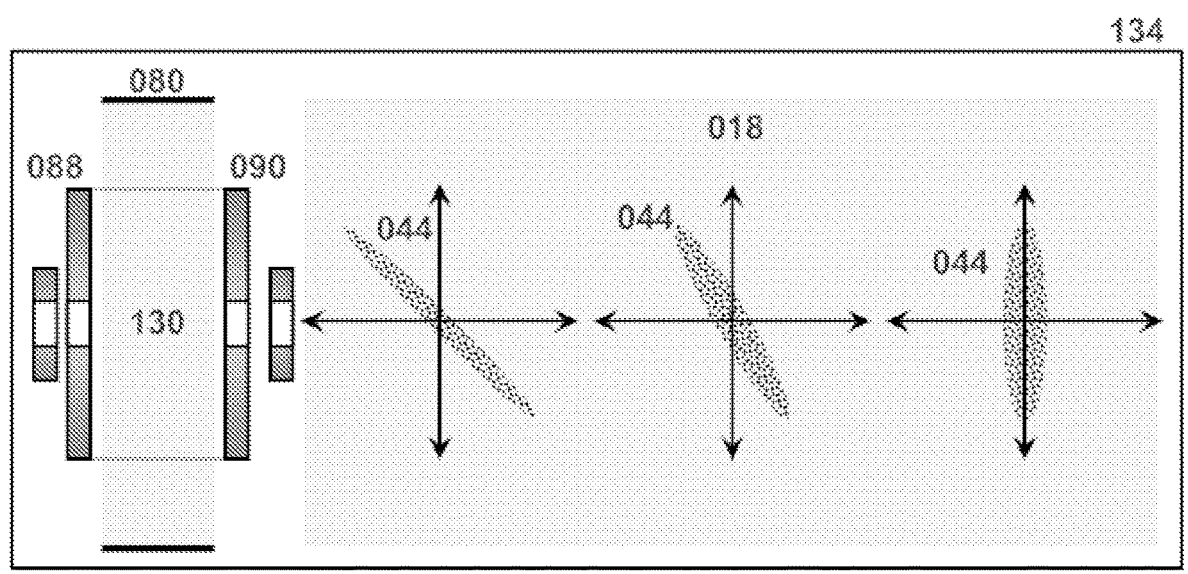
FIG. 13 is an illustration of one embodiment of an ion compression assembly [134].

In another embodiment, the controller [070] instructs the high voltage power supply [076] connected to the downstream confinement electrode [094] to provide a voltage that allows the ion beam [022] to escape the ion accumulation assembly [130]. In this embodiment the ion compression assembly [134] extends downstream of the ion accumulation assembly [130]. This embodiment is illustrated in FIG. 13.

When a differential voltage is applied between the upstream anode end cap [088] and the downstream anode end cap [090] to move the ion beam [022] in the downstream direction, the ions near the downstream anode end cap [090] leave the ion accumulation assembly [130] with lower velocities and earlier than the ions near the upstream anode end cap [088]. This introduces a correlation between longitudinal position of an ion and its longitudinal velocity. The ion beam longitudinal phase space [044] can be plotted with longitudinal position (with respect to the beam centroid) on the horizontal axis and longitudinal ion velocity (with respect to the beam centroid) on the vertical axis. FIG. 13 contains three such phase space plots at various positions of the ion beam [022] downstream of the ion accumulation assembly [130]. Note that as the ion beam [022] moves downstream the velocities of the individual ions do not change, but because of their velocity difference the phase space region rotates and shortens (the bunch length of the ion beam [022] shrinks. The longitudinal emittance of the ion beam [022], which is the area of the phase space region, does not change due to Liouville's theorem, so the phase space region changes shape. The process of compressing [034] is complete when the pulse length of the ion beam [022] is at its minimum.

In one embodiment, a radial confinement electron beam [018], similar to the distribution of stripping electrons [086], are imposed in order to continue providing radial confinement to the ion beam [022]. This region of radial confinement electron beam [018] is illustrated in FIG. 13 as the shaded region downstream of the ion accumulation assembly [130] without showing the associated electron cathode [080] and electron permeable anode [082] components needed to generate the confining [028] virtual cathode [084].

G. Accelerating [036] Ions in the Ion Source [002]

The particle accelerator [004] downstream of the ion source [002] expects an ion beam [022] that enters at a specific average longitudinal kinetic energy. The ion acceleration assembly [136] can accelerate [036] the ion beam [022] to that average kinetic energy. Accelerating [036] can be accomplished via either electrostatic acceleration, pulse electric fields, or radiofrequency electric fields.

H. Ejecting [038] Ions from the Ion Source [002]

The particle accelerator [004] downstream of the ion source [002] expects an ion beam [022] that enters with a specific beam size and divergence. The ion ejection assembly [138] can be used to radially focus the ion beam [022] to these beam size and divergence requirements. Ejecting [038] can be accomplished via magnetic elements or electrostatic elements.

I. Measuring [040] Ions Leaving the Ion Source [002]

As the ion beam [022] leaves the ion source [002] and enters the particle accelerator [004] the measuring [040] of transverse and longitudinal beam parameters is indicated. Especially at high ion beam [022] currents a common instrument is a resistive wall monitor. This device is nondestructive to the ion beam [022] and can measure both the ion beam [022] pulse length and beam current.

In the transverse direction, beam diagnostics can be used for measuring [040] the ion beam [022], e.g., beam position monitors and profile monitors. Beam position monitors are also nondestructive to the ion beam [022] and operate easily at high beam currents. Profile monitors are generally disruptive to the beam, since they commonly rely on the beam traversing an array of vertically and horizontally wires. When ions from the ion beam [022] strike the wires they produce an electrical signal that is transmitted to a computer. This information can then be used to reconstruct the horizontal and vertical shape of the ion beam [022].

J. Ion Beam Products

There are at least three embodiments and products that can be produced by an ion beam [016] composed of ions ejected [038] by said ion source [002]. In a first embodiment, at least one ion beam is used to induce nuclear fusion, the energy from which is used to produce electrical power. The energy needed to produce electrical power is harvested from the kinetic energy nuclear reaction byproducts such as alpha particles (helium-4 nuclei) [238] shown in FIG. 15 and protons (hydrogen-1 nuclei) [236], tritons (hydrogen-3 nuclei) [234], neutrons [232], and helium-3 nuclei [230] shown in FIG. 14.

Figure 14:
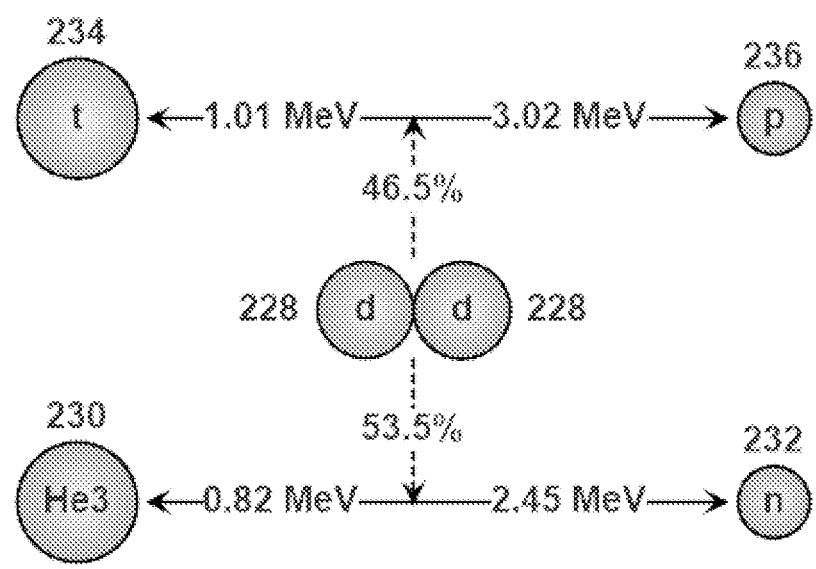
FIG. 14 is an illustration of the two fusion channels that occur when two deuterons [228] undergo nuclear fusion, including the kinetic energies of the fusion products consisting of protons (hydrogen-1 nuclei) [236], tritons (hydrogen-3 nuclei) [234], neutrons [232], and helium-3 nuclei [230].
Figure 15:
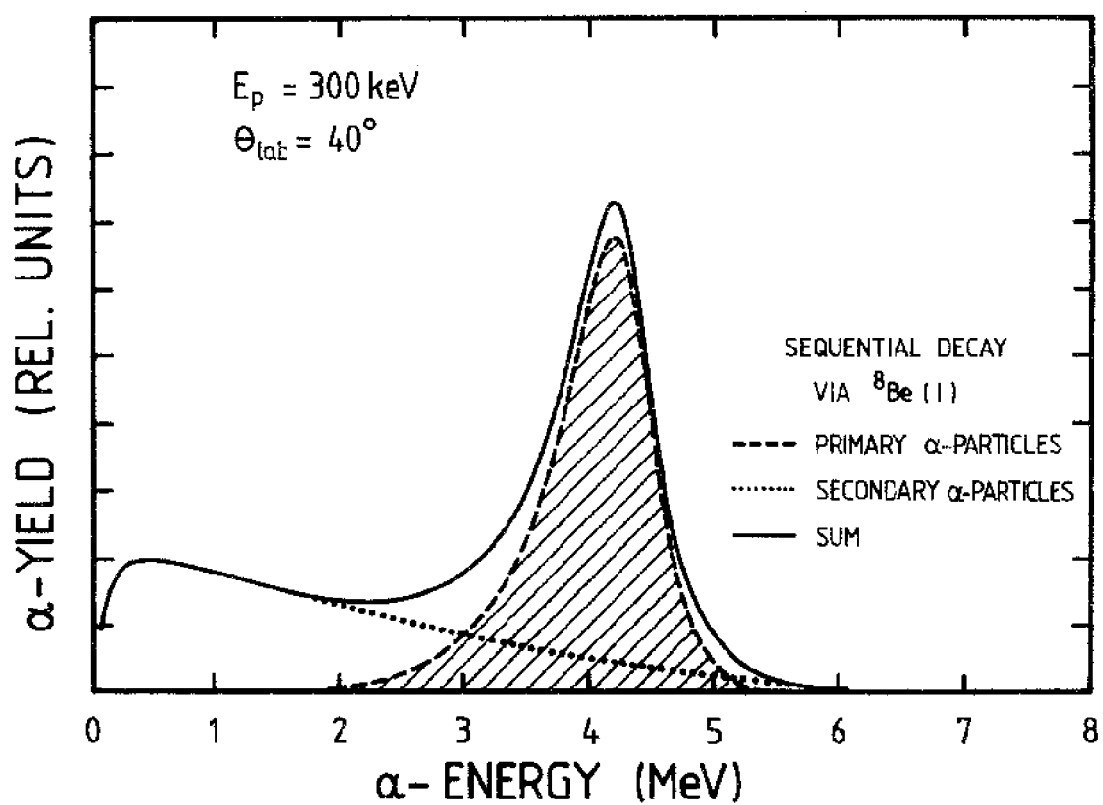
FIG. 15 is an illustration of a plot of the measured kinetic energy spectrum of alpha particles (helium-4 nuclei) [238] emitted by collisions of protons [236] on stationary boron-11 nuclei [240].

In a second embodiment, the hydrogen isotope hydrogen-3 [234] is useful, e.g., for other types of nuclear fusion reactions. As seen in FIG. 14, for every two fusion reactions approximately one nucleus of hydrogen-3 [234] is produced.

In a third embodiment, the helium isotope helium-3 [230] is useful, e.g., for other types of nuclear fusion reactions. As seen in FIG. 14, for every two fusion reactions approximately one nucleus of helium-3 [230] is produced.

K. Statement of Scope

In sum, it is important to recognize that this disclosure has been written as a thorough teaching rather than as a narrow dictate or disclaimer. Reference throughout this specification to "one embodiment", "an embodiment", or "a specific embodiment" means that a particular feature, structure, or characteristic described in connection with the embodiment is included in at least one embodiment and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other embodiments. It is to be understood that other variations and modifications of the embodiments described and illustrated herein are possible in light of the teachings herein and are to be considered as part of the spirit and scope of the present subject matter.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Variation from amounts specified in this teaching can be "about" or "substantially" or "essentially," so as to accommodate tolerance for such as acceptable manufacturing tolerances.

The foregoing description of illustrated embodiments, including what is described in the Abstract and the Modes, and all disclosure and the implicated industrial applicability, are not intended to be exhaustive or to limit the subject matter to the precise forms disclosed herein. While specific embodiments of, and examples for, the subject matter are described herein for teaching-by-illustration purposes only, various equivalent modifications are possible within the spirit and scope of the present subject matter, as those skilled in the relevant art will recognize and appreciate. As indicated, these modifications may be made in light of the foregoing description of illustrated embodiments and are to be included, again, within the true spirit and scope of the subject matter disclosed herein.

The invention claimed is:

1. A method comprising:
    ionizing at least some injected gas to form ions;
    confining, without using magnetic fields, at least some of said ions to produce confined ions;
    accumulating at least some of said confined ions to produce accumulated ions;
    reducing emittance of at least some of said accumulated ions to produce cooled ions;
    compressing, via longitudinal phase space rotation, without using magnetic fields, at least some of said accumulated ions to produce compressed ions;
    accelerating at least some of said compressed ions to produce accelerated ions;
    ejecting at least some of said accelerated ions to form ejected ions; and
    measuring at least one property of said ejected ions.

2. The method of claim 1, wherein said ionizing is carried out with the injected gas being at least one of deuterium, hydrogen, boron-11 vapor, and a vaporized compound comprised of boron-11.

3. The method of claim 2, wherein said injected gas includes said vaporized compound, and said vaporized compound comprises at least some boron hydride.

4. The method of claim 1, wherein said ionizing is carried out with a radially converging stripping electron beam.

5. The method of claim 1, wherein said ionizing is carried out in an azimuthally symmetric cylindrical geometry.

6. The method of claim 1, wherein said confining is carried out with a radially converging electron beam.

7. The method of claim 1, wherein said accumulating is achieved by carrying out the steps of ionizing, confining, and accumulating simultaneously in a same region of space.

8. The method of claim 1, wherein said ionizing is carried out in a region devoid of applied magnetic fields.

9. The method of claim 1, wherein said confining is carried out in a region devoid of applied magnetic fields.

10. The method of claim 1, wherein said accumulating is carried out in a region devoid of applied magnetic fields.

11. The method of claim 1, wherein said reducing emittance of at least some of said accumulated ions is carried out with stochastic cooling.

12. The method of claim 1, wherein said reducing emittance of at least some of said accumulated ions is carried out with electron cooling.

13. An apparatus comprising:
    a gas injection system configured to accept injected gas;
    a gas ionizer assembly configured to ionize at least some of said injected gas and thereby form ions;
    an ion confinement assembly, configured to confine, without using magnetic fields, at least some of said ions to produce confined ions;
    an ion accumulation assembly, configured to accumulate at least some of said confined ions to produce accumulated ions;
    an ion emittance reducing assembly, configured to cool at least some of said accumulated ions to produce cooled ions;
    an ion compression assembly, configured to compress, via longitudinal phase space rotation, without using magnetic fields, at least some of said accumulated ions to produce compressed ions;
    an ion acceleration assembly, configured to accelerate at least some of said compressed ions to produce accelerated ions;
    an ion ejection assembly, configured to eject at least some of said accelerated ions to produce ejected ions; and
    ion beam instrumentation, measuring at least one property of said ejected ions.

14. The apparatus of claim 13, wherein said gas injection system is configured to accept at least one of deuterium, hydrogen, boron-11 vapor, and boron-11 hydride vapor as the injected gas.

15. The apparatus of claim 13, wherein said gas ionizer assembly is comprised of a radially converging stripping electron beam.

16. The apparatus of claim 13, wherein said ion confinement assembly has an azimuthally symmetric cylindrical geometry.

17. The apparatus of claim 13, wherein said ion confinement assembly is comprised of a radially converging electron beam.

18. The apparatus of claim 13, wherein said ion accumulation assembly, ion confinement assembly, and gas ionizer assembly occupy a same region of space and share at least some components.

19. The apparatus of claim 13, wherein said ion confinement assembly is devoid of applied magnetic fields.

20. The apparatus of claim 13, wherein said ion accumulation assembly is devoid of applied magnetic fields.

* * * * *